(12) United States Patent
Kramer

(10) Patent No.: US 6,587,043 B1
(45) Date of Patent: Jul. 1, 2003

(54) DRIVER WARNING SYSTEM

(75) Inventor: Dennis A. Kramer, Troy, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 1 day.

(21) Appl. No.: 09/635,938

(22) Filed: Aug. 10, 2000

(51) Int. Cl.⁷ .............................................. B60Q 1/00
(52) U.S. Cl. ...................... 340/435; 340/436; 340/461; 340/691.1; 340/425.5
(58) Field of Search ................................ 340/435, 438, 340/439, 425.5, 436, 437, 461, 691.1, 691.6, 691.4, 692, 815.65, 815.66, 815.67

(56) References Cited

U.S. PATENT DOCUMENTS

| | | | |
|---|---|---|---|
| 5,032,821 A | * 7/1991 | Domanico et al. | 340/440 |
| 5,357,438 A | * 10/1994 | Davidian | 701/301 |
| 5,374,917 A | * 12/1994 | Hoffman et al. | 340/438 |
| 5,734,336 A | * 3/1998 | Smithline | 340/903 |

* cited by examiner

*Primary Examiner*—Julie Lieu
(74) *Attorney, Agent, or Firm*—Carlson, Gaskey & Olds

(57) ABSTRACT

The present invention provides an improved driver warning system that more effectively conveys the urgency of a potentially unsafe condition. The driver warning system detects a distance based parameter, preferably headway time or range rate, between a driver vehicle and a traffic vehicle using various sensors. A controller with a multi-variable table determines the safety status of the driver vehicle relative to the traffic vehicle. The safety status is compared to a plurality of predetermined safety status levels, which correspond to particular alert signal intensities. For example, a first alert signal intensity may be a light flashing at a first rate, and a second alert signal intensity may be the light flashing at a second rate which is greater than the first rate. A safety status level is selected for the current safety status of the driver vehicle. The alert signal, which may be the light mentioned above, is activated at the alert signal intensity for the selected safety status.

24 Claims, 1 Drawing Sheet

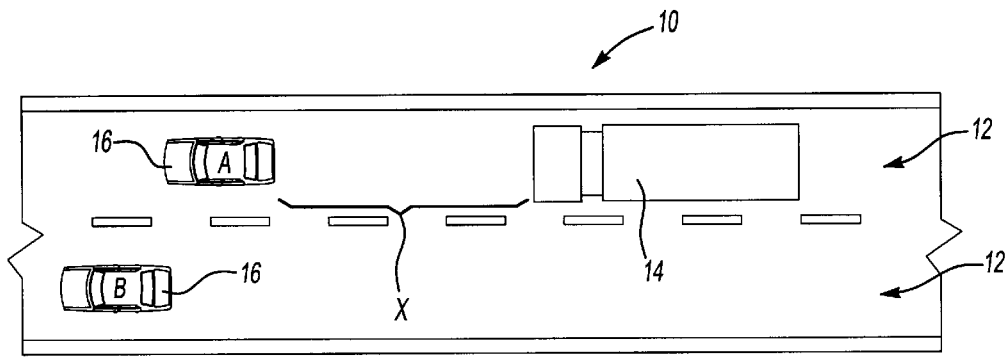
*Fig-1*
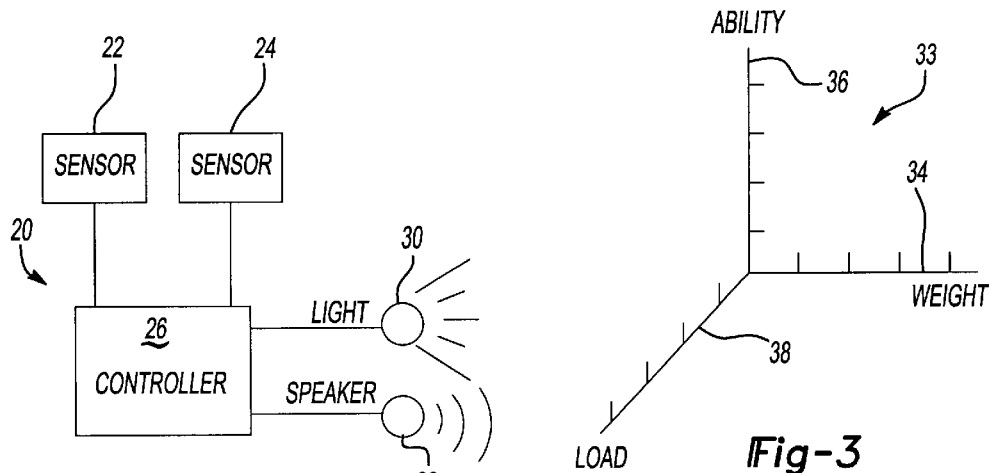
*Fig-2*
*Fig-3*
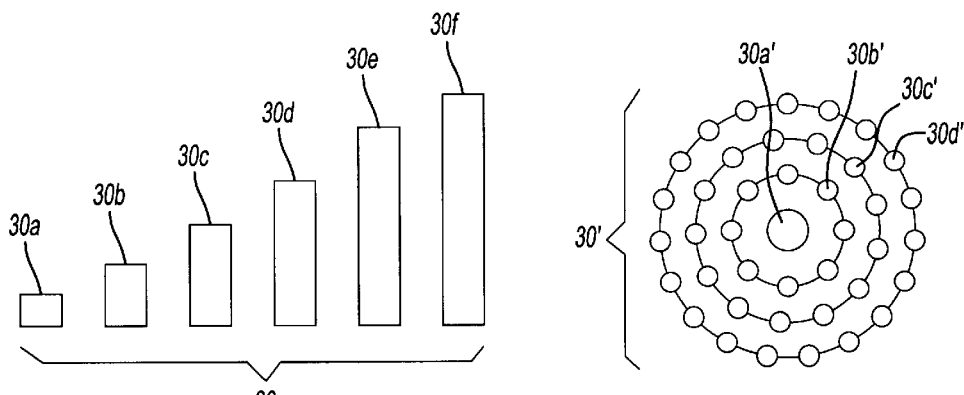
*Fig-4A*
*Fig-4B*

DRIVER WARNING SYSTEM

BACKGROUND OF THE INVENTION

This invention relates to a driver warning system for a vehicle, and more specifically, the invention relates to a driver warning system that better conveys to the vehicle driver the relative safety of the driving condition.

Vehicles are incorporating more sophisticated equipment to assist a driver in more safely operating a vehicle. Some equipment has been directed to monitoring the conditions between the driver's vehicle and a traffic vehicle. Specifically, the distance between the driver and traffic vehicles is monitored to minimize the potential for collisions between the vehicles. A complex system of sensors and software has been employed to detect, for example, the position of traffic vehicles in various lanes of traffic and the change in speed of the traffic vehicles. When a potentially unsafe condition arises, the driver is warned in sufficient time to take corrective action if necessary. However, some relevant driver vehicle handling conditions have not been considered when determining the safety status of the vehicle.

Commercial vehicles have numerous systems that provide feedback to the driver, typically through lights or buzzers located in the driver cab. As a result, there are many lights and sounds that the driver must distinguish between to properly identify the message being relayed to the driver by the vehicle's systems. Typically, a single light with steady or flashing illumination has been used to alert the driver of a potentially unsafe condition. Alternatively, a buzzer has been used instead of the light. Because there are so many lights and buzzers in the vehicle cab, warnings often go unnoticed or are ignored by the driver. Therefore, what is needed is a driver warning system that detects additional vehicle handling conditions and produces warnings in the vehicle cab that are easily identifiable by the driver and which correlate to the magnitude of the potentially unsafe condition.

SUMMARY OF THE INVENTION AND ADVANTAGES

The present invention provides an improved driver warning system that more effectively conveys the urgency of a potentially unsafe condition. The driver warning system detects a distance based parameter, preferably headway time or range rate, between a driver vehicle and a traffic vehicle using various sensors. A controller with a multi-variable table determines the safety status of the driver vehicle relative to the traffic vehicle. The safety status is compared to a plurality of predetermined safety status levels, which correspond to particular alert signal intensities. For example, a first alert signal intensity may be a light flashing at a first rate, and a second alert signal intensity may be the light flashing at a second rate which is greater than the first rate. A safety status level is selected for the current safety status of the driver vehicle. The alert signal, which may be the light mentioned above, is activated at the alert signal intensity for the selected safety status.

Accordingly, the above invention provides a driver warning system that detects additional vehicle handling conditions and produces warnings in the vehicle cab that are easily identifiable by the driver and which correlate to the magnitude of the potentially unsafe condition.

BRIEF DESCRIPTION OF THE DRAWINGS

Other advantages of the present invention can be understood by reference to the following detailed description when considered in connection with the accompanying drawings wherein:

FIG. 1 is an elevational view of roadway traffic;

FIG. 2 is a schematic view of a driver warning system of the present invention;

FIG. 3 is an embodiment of a multi-variable table used in selecting a safety status level;

FIG. 4A is a first embodiment of an alert signal of the present invention; and

FIG. 4B is a second embodiment of an alert signal of the present invention.

DETAILED DESCRIPTION OF THE PREFERRED EMBODIMENT

FIG. 1 depicts a roadway 10 having several traffic lanes 12. A driver vehicle 14 travels along the traffic lanes 12 with traffic vehicle 16. It is, of course, desirable that the traffic vehicle 14 maintain a safe distance X from the traffic vehicle 16 to avoid collisions between the vehicles 14, 16 or a rollover of the driver vehicle 14 during a sudden application of the brakes. To this end, as mentioned above, driver warnings systems have been developed to convey any potentially unsafe conditions to the driver.

The present invention driver warning system 20 incorporates sensors that communicate with a controller 26 which activates an alert signal that captures the attention of the driver. A first sensor 22 detects a distance based parameter such as headway time or range rate. Headway time is the time it would take for the driver vehicle 14 to collide with the traffic vehicle 16 based upon current conditions. For example, a headway time of 10 seconds means that driver vehicle 14 traveling at its current rate with impact traffic vehicle 16 driving at its current rate in 10 seconds. Range rate is the change in distance between the driver vehicle 14 and the traffic vehicle 16 over time. One convention used to measure range rate is that an increase in distance over time is positive while a decrease in distance between the vehicles over time is negative. For example, a range rate of positive 10 feet per second means that the traffic vehicle 16 is increasing its distance from the driver vehicle 14 at a rate of 10 feet per second, or pulling away from the driver vehicle 14. The first sensor 22 may also detect other variations of headway range rate or other distance based parameters.

Other relevant information besides the distance-based parameters discussed above impact the safety status of the vehicle 14. The driver warning system 20 may also include a second sensor 24 that detects driver vehicle handling conditions to provide improved warning to the driver. By providing additional information on driver vehicle handling conditions a more accurate safety status may be conveyed to the driver based upon real time operating conditions. Several sensors may be used to gather the driver vehicle handling conditions. Driver vehicle weight may be monitored on a real time basis to determine the effects of the vehicle's current cargo on the safety status of the vehicle. The vehicle's load condition as it travels up or down an incline or decline may also be detected to determine its effects on the safety status of the vehicle. Furthermore, the stopping ability of the vehicle may be determined. For example, if the road conditions are icy or wet, or if the vehicle is traveling around a curve, the safety condition of the vehicle may be affected.

The safety status of the vehicle may be determined using various calculations and lookup tables. The controller 26 receives data from sensors 22, 24 and assesses the safety status of the vehicle. As shown in FIG. 3, a multi-variable table 33 may be used to compare the safety status of the vehicle to predetermine safety status levels. The safety status levels are used to relate the degree of potential hazard. For example, a higher number may be used to represent a greater risk of collision. The table 33 may include, for example, an axis 34 having weight values, an axis 36 having stopping ability values, and an axis 38 having vehicle load values. Once the distance-based parameter and the vehicle handling conditions are sensed, the values are compared to the table 33. A particular combination of values corresponds to a particular safety status level. For example, a distance between the driver vehicle and the traffic vehicle of 100 feet and a particular stopping ability load and weight may indicate a safety status level of 0, that is, a safe condition. In this condition no alert signal would be activated. If the vehicle weight is increased by 5,000 with all the other conditions being constant, the safety status level may be increased to 1 and the alert signal may be activated at its lowest intensity. In the prior art, the alert signal, which may be a light, may have simply been illuminated, which was often easily ignored by the driver.

The alert signal of the present invention has a plurality of operational states each having a particular alert signal intensity that corresponds to a particular safety status level. If the alert signal is a light, the light would be off at a 0 safety status level. At a safety status level of 1, which represents the lowest potentially unsafe condition, the light 30 may flash slowly. For a safety status level of 2, which represents an increased potential for an unsafe condition, the light 30 may flash at a more rapid rate. In this manner, the increased hazard will be conveyed to the driver in a way that will more likely catch his attention. As the safety status level increases the light 30 flashes at an even more rapid rate. Similarly, if the alert signal is a speaker 32 the buzzer rate may increase or the tone may become more shrill as the hazard increases.

Additionally, the alert signal lights 30 may be arranged in a configuration that will clearly convey the magnitude of the potentially unsafe condition to the driver. One such configuration is shown in FIG. 4A in which a cluster of lights is arranged in a triangular pattern. A small light 30a may be illuminated when the safety status level is lowest. A light 30b may be illuminated in addition to the light 30a when the safety status level increases. Additional lights 30c–30f may be illuminated one-by-one as the safety status level increases. An alternative light configuration is shown in FIG. 4B. The light cluster 30' includes a light 30a' which becomes illuminated at the lowest safety status level. A ring of lights 30b' arranged about the light 30a' is also illuminated as the safety status level increases. Additional rings of lights 30c' and 30d' may also become illuminated as the safety status level increases. It is to be understood that other light configurations may be used. Also, the lights may flash or speaker 32 may be used in addition to the lights 30.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method of warning a driver of a potentially unsafe condition comprising the steps of:

a) detecting a distance-based parameter between a driver vehicle and a traffic vehicle;

b) determining a safety status of the driver vehicle relative to the traffic vehicle including referencing a multivariable lookup table corresponding to a plurality of predetermined safety statuses;

c) comparing the safety status to a plurality of safety status levels with each of the plurality of safety status levels corresponding to a particular alert signal intensity;

d) selecting a safety status level for the safety status; and e) activating an alert signal at the alert signal intensity for the safety status.

2. The method according to claim 1, wherein step b) includes detecting a driver vehicle weight for comparison to a weight table.

3. The method according to claims 1, wherein step b) includes detecting a driver vehicle load for comparison to a load table.

4. The method according to claim 1, wherein step b) includes detecting a driver vehicle stopping ability for comparison to a stopping ability table.

5. The method according to claim 1, wherein the alert signal is a light.

6. The method according to claim 5, wherein the plurality of safety status levels includes first and second status levels in which the first status level corresponds to an alert signal intensity in which the light flashes at a first rate and the second status level corresponds to an alert signal intensity in which the light flashes at a second rate that is greater than the first rate, the second status level representing a greater potential of an unsafe condition than the first status level.

7. The method according to claim 5, wherein the plurality of safety status levels includes first and second status levels in which the first status level corresponds to an alert signal intensity in which the light has a first brightness and the second status level corresponds to an alert signal intensity in which the light has a second brightness that is greater than the first brightness, the second status level representing a greater potential of an unsafe condition than the first status level.

8. The method according to claim 5, wherein the plurality of safety status levels includes first and second status levels in which the first status level corresponds to an alert signal intensity in which the light yellow and the second status level corresponds to an alert signal intensity in which the light is red, the second status level representing a greater potential of an unsafe condition than the first status level.

9. The method according to claim 9, wherein the light is a plurality of lights, the plurality of lights including a first light that corresponds to a first status level and a second light that together with the first light corresponds to a second status level.

10. The method according to claim 1, wherein the alert signal is a speaker.

11. The method according to claim 10, wherein the plurality of safety status levels includes first and second status levels in which the first status level corresponds to an alert signal intensity in which the speaker buzzes at a first rate and the second status level corresponds to an alert signal intensity in which the speaker buzzes at a second rate that is greater than the first rate, the second status level representing a greater potential of an unsafe condition than the first status level.

12. The method according to claim 10, wherein the plurality of safety status levels includes first and second status levels in which the first status level corresponds to an alert signal intensity in which the speaker buzzes at a first tone and the second status level corresponds to an alert signal intensity in which the speaker buzzes at a second tone that is more shrill than the first rate, the second status level representing a greater potential of an unsafe condition than the first status level.

13. A driver warning system comprising:
   a first sensor for detecting a distance-based parameter between a driver vehicle and a traffic vehicle;
   a second sensor for detecting a driver vehicle handling condition;
   a controller having a multi-variable lookup table corresponding to a plurality of predetermined safety statuses including said distance-based parameter and said driver vehicle handling condition for determining a plurality of safety status levels which includes first and second status levels; and
   an alert signal having first and second operational states representing said first and said second safety status levels, respectively, said second operational state being more intense than said first operational state.

14. The system according to claim 13, wherein said distance-based parameter is headway time.

15. The system according to claim 13, wherein said distance-based parameter is range rate.

16. The system according to claim 13, wherein said alert signal is a light.

17. The system according to claim 16, wherein said light is a cluster of lights arranged in a generally triangular pattern with a first light of a first size corresponding to said first operational state and a second light of a second size greater than said first size and corresponding to said second operational state.

18. The system according to claim 16, wherein said light is a cluster of lights arranged in a generally circular pattern with a first central light and a second group of lights arranged radially about the first central light with the first light corresponding to said first operational state and said second lights corresponding to said second operational state.

19. The system according to claim 13, wherein said alert signal is a speaker.

20. The system according to claim 13, wherein said vehicle handling condition is driver vehicle weight.

21. The system according to claim 13, wherein said vehicle handling condition is driver vehicle load.

22. The system according to claim 13, wherein said vehicle handling condition is vehicle stopping ability.

23. A method of warning a driver of a potentially unsafe condition comprising the steps of:
   a) detecting headway time between a driver vehicle and a traffic vehicle;
   b) determining a safety status of the driver vehicle relative to the traffic vehicle;
   c) comparing the safety status to a plurality of safety status levels with each of the plurality of safety status levels corresponding to a particular alert signal intensity;
   d) selecting a safety status level for the safety status; and
   e) activating an alert signal at the alert signal intensity for the safety status.

24. A method of warning a driver of a potentially unsafe condition comprising the steps of:
   a) detecting range rate between a driver vehicle and a traffic vehicle;
   b) determining a safety status of the driver vehicle relative to the traffic vehicle;
   c) comparing the safety status to a plurality of safety status levels with each of the plurality of safety status levels corresponding to a particular alert signal intensity;
   d) selecting a safety status level for the safety status; and
   e) activating an alert signal at the alert signal intensity for the safety status.

* * * * *

UNITED STATES PATENT AND TRADEMARK OFFICE
CERTIFICATE OF CORRECTION

PATENT NO.    : 6,587,043 B1
DATED         : July 1, 2003
INVENTOR(S)   : Kramer It is certified that error appears in the above-identified patent and that said Letters Patent is hereby corrected as shown below:

<u>Column 4,</u>
Line 47, "9" should be -- 5 --.

<u>Column 5,</u>
Line 2, "rate" should be -- tone --.

Signed and Sealed this

Eleventh Day of November, 2003

JAMES E. ROGAN
*Director of the United States Patent and Trademark Office*